United States Patent
Lee et al.

(10) Patent No.: US 8,964,737 B2
(45) Date of Patent: Feb. 24, 2015

(54) WIRELESS COMMUNICATION CIRCUIT SUPPORTING ANTENNA DIVERSITY

(71) Applicant: Realtek Semiconductor Corp., Hsinchu (TW)

(72) Inventors: Tsung-Hsuan Lee, Taipei (TW); Chung-Yao Chang, Zhubei (TW); Der-Zheng Liu, Hsinchu County (TW)

(73) Assignee: Realtek Semiconductor Corp., Hsinchu (TW)

( * ) Notice: Subject to any disclaimer, the term of this patent is extended or adjusted under 35 U.S.C. 154(b) by 134 days.

(21) Appl. No.: 13/734,411

(22) Filed: Jan. 4, 2013

(65) Prior Publication Data

US 2013/0176878 A1 Jul. 11, 2013

(30) Foreign Application Priority Data

Jan. 5, 2012 (TW) .............................. 101100410 A

(51) Int. Cl.
*H04L 12/28* (2006.01)
*H04W 24/02* (2009.01)
*H04B 7/08* (2006.01)

(52) U.S. Cl.
CPC ............ *H04W 24/02* (2013.01); *H04B 7/0805* (2013.01); *H04B 7/0811* (2013.01)
USPC ............................ 370/389; 370/236; 370/254

(58) Field of Classification Search
None
See application file for complete search history.

(56) References Cited

U.S. PATENT DOCUMENTS

| 5,748,676 A * | 5/1998 | Mahany ........................ 375/260 |
| 6,281,840 B1 * | 8/2001 | Miyoshi et al. ............... 342/374 |
| 6,292,516 B1 * | 9/2001 | Petsko et al. .................. 375/267 |
| 6,415,141 B1 * | 7/2002 | Kakura et al. ............. 455/277.1 |
| 2003/0002471 A1 | 1/2003 | Crawford et al. |
| 2004/0266374 A1 | 12/2004 | Saed et al. |
| 2006/0154618 A1 | 7/2006 | Doi et al. |
| 2009/0027260 A1 | 1/2009 | Runyon et al. |
| 2010/0009649 A1 * | 1/2010 | Huebner et al. ............... 455/334 |
| 2013/0176878 A1 * | 7/2013 | Lee et al. ...................... 370/252 |

FOREIGN PATENT DOCUMENTS

WO    WO 98/19402 A1    5/1998

* cited by examiner

*Primary Examiner* — Robert Wilson
(74) *Attorney, Agent, or Firm* — Birch, Stewart, Kolasch & Birch, LLP

(57) ABSTRACT

A wireless communication circuit for a wireless communication device having a plurality of antennas is disclosed. The wireless communication circuit includes: a transceiver for receiving and transmitting network packets; a control circuit for controlling the switching circuit to switch the transceiver among the antennas so that the transceiver receives the preamble of a first network packet; and a receiving signal strength detector for detecting the receiving signal strength value of respective antennas in respective receiving periods during the reception of the preamble conducted by the transceiver. If the receiving signal strength value of each antenna is less than a predetermined threshold, the control circuit selects an antenna with the maximum receiving strength value as a target antenna and controls the switching circuit to couple the transceiver to the selected target antenna so that the transceiver receives the rest of the first network packet through the target antenna.

16 Claims, 8 Drawing Sheets

|  | Antenna A | Antenna B | Antenna C | ... | Antenna N |
|---|---|---|---|---|---|
| Source address 1 | S1A | S1B | S1C | ... | S1N |
| Source address 2 | S2A | S2B | S2C | ... | S2N |
| Source address 3 | S3A | S3B | S3C | ... | S3N |
| ... | ... | ... | ... | ... | ... |
| Source address K | SKA | SKB | SKC | ... | SKN |

WIRELESS COMMUNICATION CIRCUIT SUPPORTING ANTENNA DIVERSITY

CROSS-REFERENCE TO RELATED APPLICATIONS

This application claims the benefit of priority to Patent Application No. 101100410, filed in Taiwan on Jan. 5, 2012; the entirety of which is incorporated herein by reference for all purposes.

BACKGROUND

The disclosure generally relates to a wireless communication circuit and, more particularly, to a wireless communication circuit supporting antenna diversity operation.

In a wireless communication system, signal transmission performance of the wireless communication circuit is influenced by channel effect of the surrounding environment and often affected due to the orientation of the antenna.

The wireless communication system adopting only a single antenna has the merits of lower hardware cost and is easier to control of the signal transmission, but the signal transmission quality and transmission speed are often degraded due to poor antenna reception.

When adopting multiple antennas to improve the transmission quality, multiple sets of receiver circuits are required to process signals received by different antennas. Such structure not only requires higher hardware cost, but also occupies considerable volume, and thus such structure is not an ideal solution. Moreover, the channel environment for wireless signals may vary all the time. The signal transmission quality and transmission speed of the wireless communication circuit will degrade if the wireless communication circuit is unable to rapidly respond to the variation of the channel environment.

SUMMARY

In view of the foregoing, it can be appreciated that a substantial need exists for apparatuses that can mitigate or reduce the problem of poor antenna reception and effectively improve the transmission speed of a wireless communication system and the response speed with respect to the channel variations.

An embodiment of a wireless communication circuit for controlling a switching circuit of a wireless communication device having a plurality of antennas is disclosed. The wireless communication circuit comprises: a transceiver for receiving and transmitting network packets; a control circuit, coupled with the transceiver, for controlling the switching circuit to switch the transceiver among the plurality of antennas so that the transceiver receives a preamble of a first network packet; a receiving signal strength detector, coupled with the transceiver and the control circuit, for respectively detecting receiving signal strength values of the plurality of antennas with respect to respective receiving periods of the plurality of antennas while the transceiver receives the preamble; if each of the receiving signal strength values of the plurality of antennas is less than a predetermined threshold, then the control circuit selects an antenna with a maximum receiving signal strength value as a target antenna and controls the switching circuit to couple the transceiver with the selected target antenna so that the transceiver receives a remaining portion of the first network packet including a header and a payload of the first network packet through the target antenna.

The control circuit of aforementioned embodiments selects an antenna to be utilized for receiving signals on a packet-by-packet basis to dynamically adjust the antenna for receiving signals according to the change of surrounding environment, thereby acquiring better signal receiving performance.

The control circuit of aforementioned embodiments may also selects an antenna to be utilized for transmitting signals on a packet-by-packet basis to dynamically adjust the antenna for transmitting signals so as to rapidly respond to the change of the channel situations, thereby acquiring better signal transmitting performance It is to be understood that both the foregoing general description and the following detailed description are example and explanatory only and are not restrictive of the invention, as claimed.

BRIEF DESCRIPTION OF THE DRAWINGS

FIG. 8 shows a simplified schematic diagram of a receiving signal strength mapping between each of the antennas and each of source addresses of received packets.

DETAILED DESCRIPTION

Reference is made in detail to embodiments of the invention, which are illustrated in the accompanying drawings.

The same reference numbers may be used throughout the drawings to refer to the same or like parts, components, or operations. Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to . . . ." Also, the phrase "coupled with" is intended to compass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

The term "and/or" may comprise any and all combinations of one or more of the associated listed items. In addition, the singular forms "a", "an", and "the" herein are intended to comprise the plural forms as well, unless the context clearly indicates otherwise.

Figure 1:
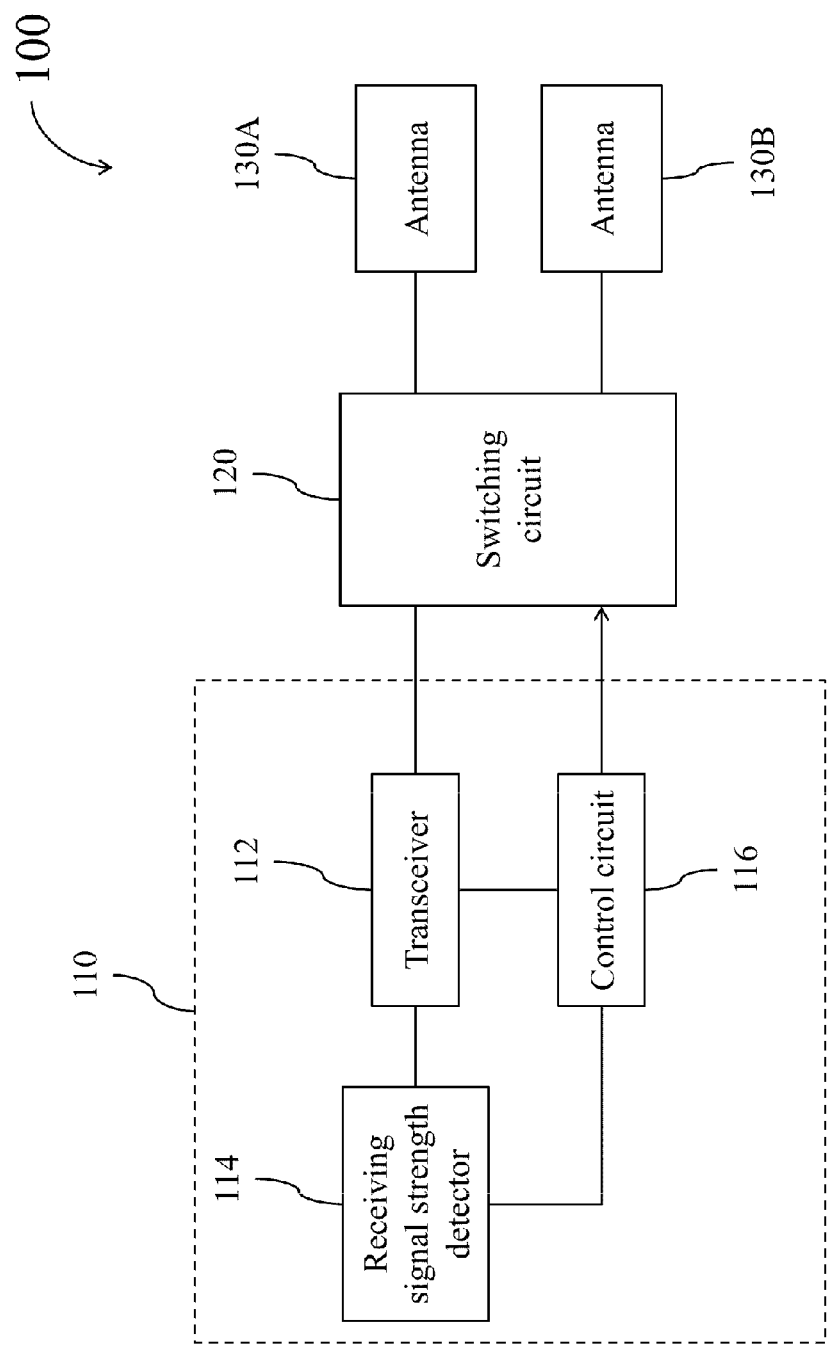
FIG. 1 shows a simplified functional block diagram of a wireless communication device according to a first embodiment of the present disclosure.

FIG. 1 shows a simplified functional block diagram of a wireless communication device 100 according to a first embodiment of the present disclosure. The wireless communication device 100 comprises a wireless communication circuit 110, a switching circuit 120, antennas 130A and 130B. The wireless communication circuit 110 comprises a transceiver 112, a receiving signal strength detector 114, and a control circuit 116.

In implementation, the transceiver 112, the receiving signal strength detector 114, and the control circuit 116 of the wireless communication circuit 110 may be integrated into a single circuit chip. In other embodiments, the wireless communication circuit 110 and the switching circuit 120 may be integrated into a single circuit chip. In application, the wireless communication device 100 may be any Wireless Local Area Network (WLAN) device, such as an AP or a wireless network card, or any electronic equipment having wireless communication capability, such as a tablet computer, an electronic book, a mobile communication device, or a smart phone, etc.

Figure 2:
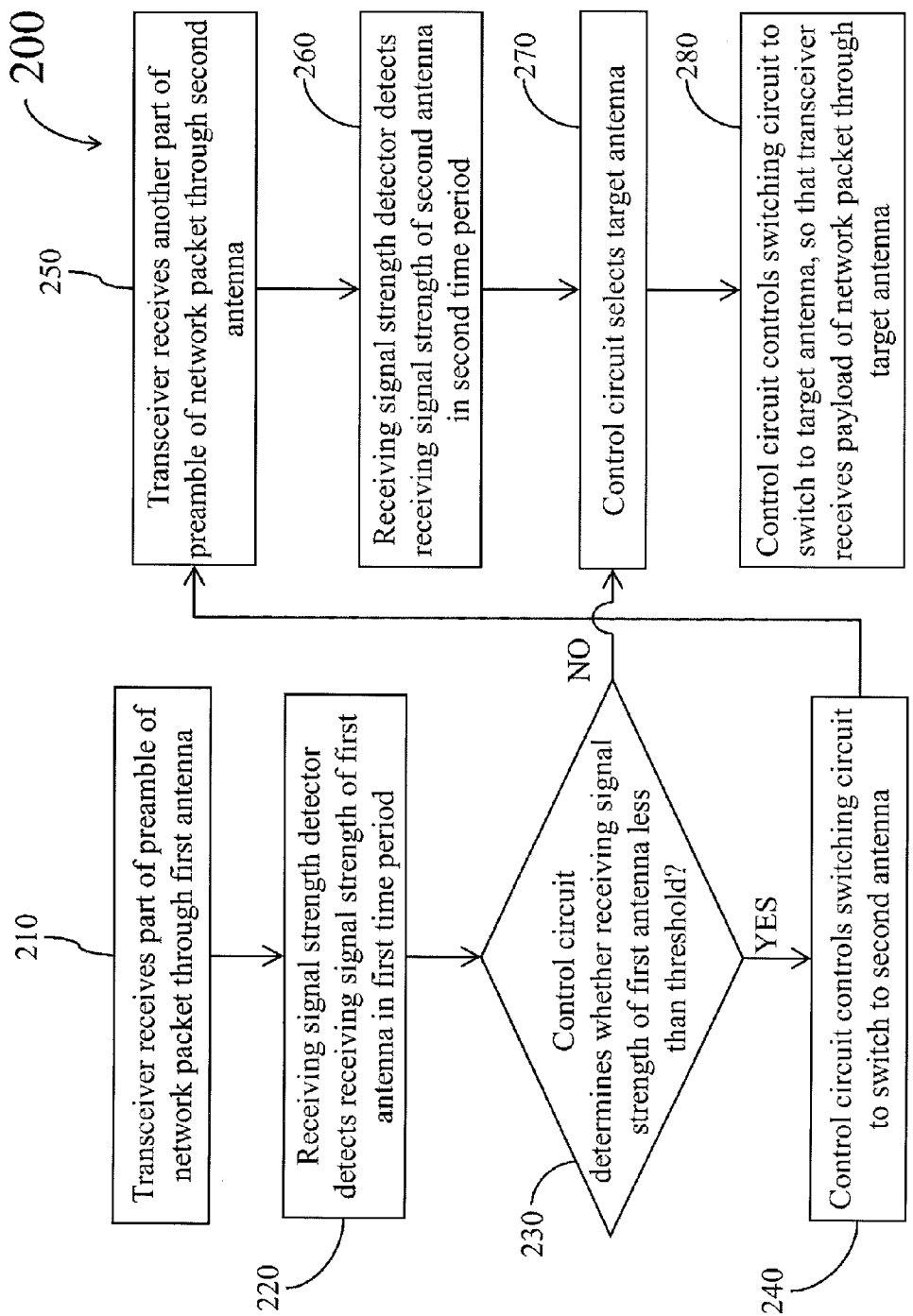
FIG. 2 shows a simplified flowchart illustrating an antenna diversity method according to an embodiment of the present disclosure.

Please refer to FIG. 2, which shows a simplified flowchart 200 of an antenna diversity method according to one embodiment of the present disclosure. The operation method of the wireless communication device 100 will be further illustrated with reference to the flowchart 200.

Before receiving network packets, the control circuit 116 of the wireless communication circuit 110 selects an antenna as a standby antenna and controls the switching circuit 120 to couple the transceiver 112 with the standby antenna to detect network packets. For illustrative purpose, it is assumed hereafter that the control circuit 116 controls the switching circuit 120 to couple the transceiver 112 with the antenna 130A to detect network packets.

Figure 3:
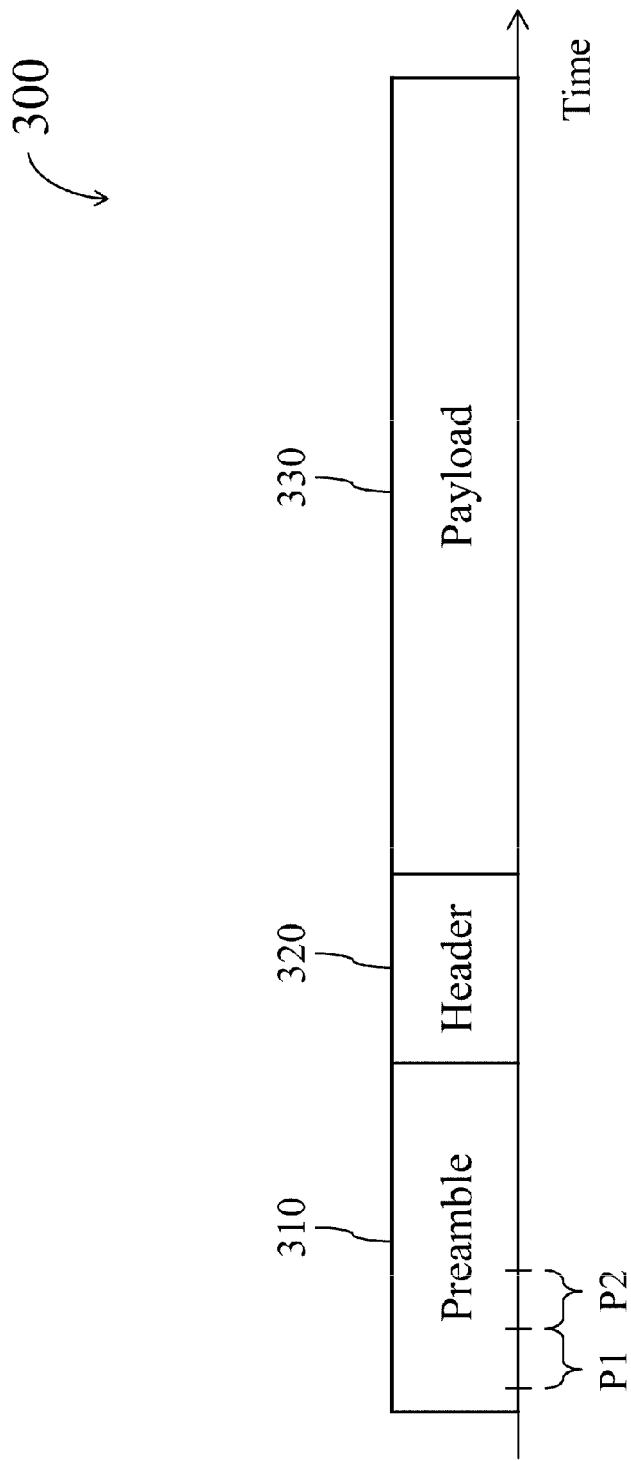
FIG. 3 shows a simplified schematic of a network packet according to an embodiment of the present disclosure.

When the transceiver 112 detects a network packet 300 as shown in FIG. 3 through the antenna 130A, the transceiver 112 performs an operation 210 to receive a part of a preamble 310 of the network packet 300 through the antenna 130A.

While the transceiver 112 performs the operation 210, the receiving signal strength detector 114 of the wireless communication circuit 110 performs an operation 220 to detect receiving signal strength of the antenna 130A in a time period P1 to generate a receiving signal strength value S1. The receiving signal strength value S1 may be an average receiving signal strength of the antenna 130A in a unit time.

Then, the control circuit 116 of the wireless communication circuit 110 performs an operation 230 to compare the receiving signal strength S1 corresponding to the antenna 130A and a predetermined threshold STH.

If the comparison result of the control circuit 116 in the operation 230 is that the receiving signal strength S1 is greater than or equal to the predetermined threshold STH, the control circuit 116 proceeds to an operation 270 and selects the antenna 130A as a target antenna and skips an antenna switching operation 240. Then, the control circuit 116 controls the switching circuit 120 to continue to couple the transceiver 112 with the antenna 130A in an operation 280, so that the transceiver 112 receives a remaining portion of the network packet 300 including a header 320 and a payload 330 of the network packet 300 through the target antenna 130A.

On the contrary, if the comparison result of the control circuit 116 in an operation 230 is that the receiving signal strength S1 is smaller than the predetermined threshold STH, the control circuit 116 proceeds to the operation 240 to control the switching circuit 120 to couple the transceiver 112 with the antenna 130B.

Then, the transceiver 112 performs an operation 250 to receive another part of the preamble 310 of the network packet 300 through the antenna 130B.

While the transceiver 112 performs the operation 250, the receiving signal strength detector 114 performs an operation 260 to detect receiving signal strength of the antenna 130B in a time period P2 to generate a receiving signal strength value S2. The receiving signal strength value S2 may be an average receiving signal strength of the antenna 130B in a unit time. In implementation, the aforementioned time period P2 may follow the time period P1 instantly, or may have a time gap with the time period P1. In addition, the length of the time period P1 and the length of the time period P2 may be equal. Alternatively, the length of the time period P1 or the time period P2 may be extended or shortened as needed.

Then, the control circuit 116 performs the operation 270 to compare the receiving signal strength value S2 of the antenna 130B with the previous receiving signal strength value S1 of the antenna 130A to decide a target antenna. In one embodiment, if the receiving signal strength value S2 is smaller than the receiving signal strength value S1, the control circuit 116 selects the antenna 130A as the target antenna. If the receiving signal strength value S2 is greater than or equal to the receiving signal strength value S1, the control circuit 116 selects the antenna 130B as the target antenna.

In the operation 280, the control circuit 116 controls the switching circuit 120 to couple the transceiver 112 with the target antenna selected in the operation 270, so that the transceiver 112 receives the remaining portion of the network packet 300 including the header 320 and the payload 330 of the network packet 300 through the target antenna.

Afterward, when the wireless communication circuit 110 detects a next network packet, the transceiver 112 and the control circuit 116 repeat the operations of the aforementioned flowchart 200 to the network packet. In other words, the wireless communication circuit 110 selects an antenna to be utilized for receiving signals on a packet-by-packet basis. Accordingly, the control circuit 116 is capable of dynamically adjusting the antenna utilized by the transceiver 112 for receiving signals according to the change of environment where the wireless communication device 100 resides, thereby acquiring better signal receiving performance.

In addition, the wireless communication circuit 110 may also select an antenna to be utilized for transmitting signals on a packet-by-packet basis. For example, in one embodiment, before the wireless communication circuit 110 transmits a network packet to other wireless communication devices, the control circuit 116 controls the switching circuit 120 to couple the transceiver 112 with an antenna that is a most recently selected receiving antenna, so that the transceiver 112 transmits network packets through the selected antenna.

In another embodiment, the control circuit 116 records a certain number of recent antenna selection decisions. Before the wireless communication circuit 110 transmits a network packet to other wireless communication device, the control circuit 116 selects an antenna that is selected to be a receiving antenna more frequent than other antennas in a plurality of recent packet receiving operations to be a transmitting antenna, and control the switching circuit 120 to couple the transceiver 112 with the transmitting antenna, so that the transceiver 112 transmits network packets through the transmitting antenna.

In another embodiment, the control circuit 116 records a mapping relationship between each source address (such as a source IP address or a source MAC address) of received network packets and each antenna utilized for receiving those network packets. Before the wireless communication circuit 110 transmits a network packet to a wireless communication device of a specific source address, the control circuit 116 selects an antenna for receiving network packets from the target source address most recently to be a transmitting antenna, and controls the switching circuit 120 to couple the transceiver 112 with the transmitting antenna 112, so that the transceiver 112 transmits network packets through the transmitted antenna. As a result, the wireless communication circuit 110 is enabled to communicate network packets with a specific wireless communication device through the same antenna.

In another embodiment, the control circuit 116 records a mapping relationship between each source address (such as a source IP address or a source MAC address) of received network packets and each antenna utilized for receiving those network packets. Before the wireless communication circuit 110 transmits a network packet to a wireless communication device of a specific source address, the control circuit 116 selects an antenna for receiving network packets from the target source address more frequent than other antennas in a plurality of recent packet receiving operations to be a transmitting antenna, and control the switching circuit 120 to couple the transceiver 112 with the transmitting antenna 112, so that the transceiver 112 transmits network packets through the transmitted antenna. As a result, the wireless communication circuit 110 is enabled to communicate network packets with a specific wireless communication device based on a majority decision.

By adopting the aforementioned antenna diversity method, the control circuit 116 is capable of dynamically adjusting the antenna utilized by the transceiver 112 for transmitting signals so as to rapidly respond to the change of signal channel conditions of the wireless communication device 100, thereby acquiring better signal transmitting performance. As a result, the wireless communication device 100 is enabled to reduce the possibility of packet loss caused by the variation of the environment, thereby improving the communication quality and transmission speed of the wireless communication device 100.

The aforementioned two-antenna diversity structure can be extended to applications where multiple antennas are employed. Further details will be described in the following with reference to FIG. 4-FIG. 6.

Figure 4:
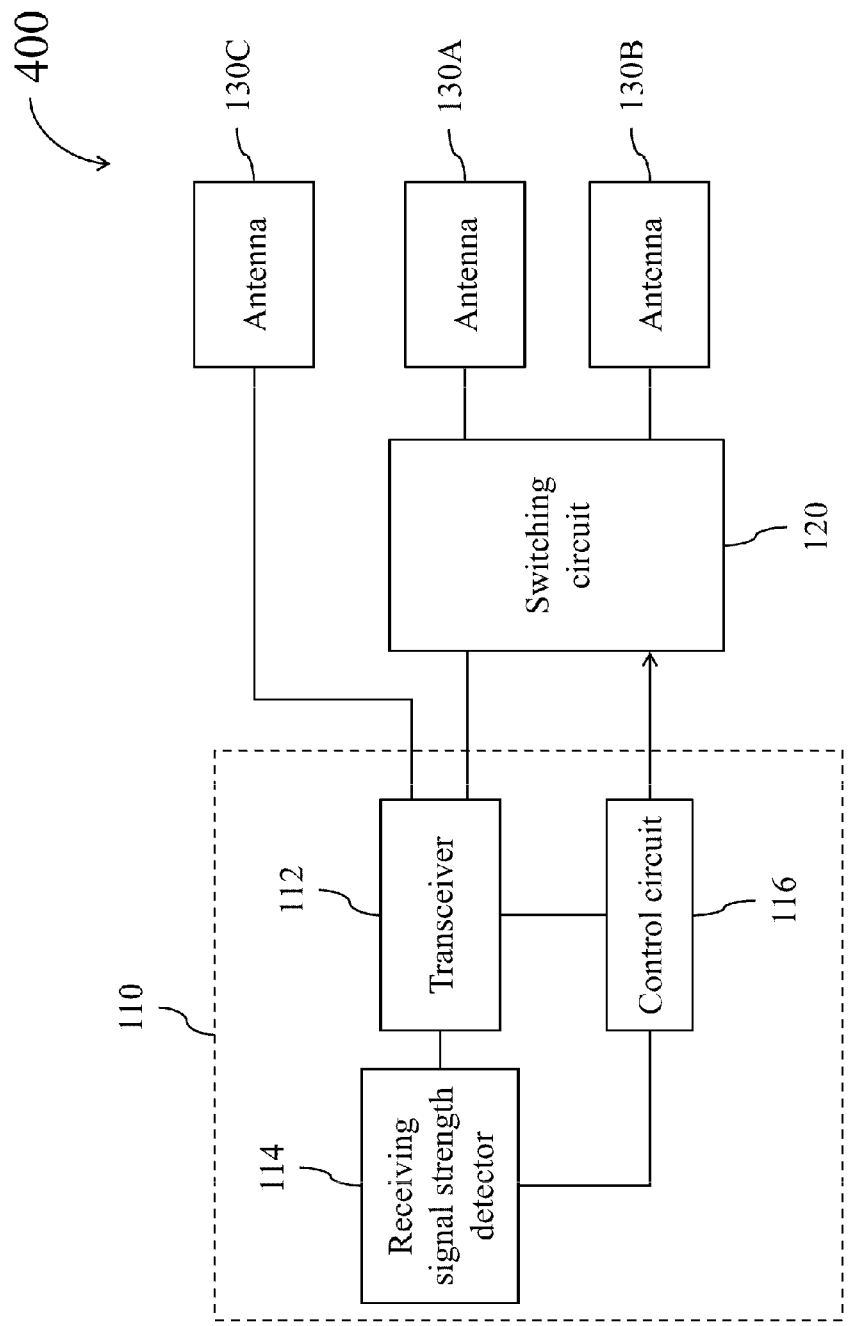
FIG. 4 shows a simplified functional block diagram of a wireless communication device according to a second embodiment of the present disclosure.

FIG. 4 shows a simplified functional block diagram of a wireless communication device 400 according to a second embodiment of the present disclosure. Compared to the wireless communication device 100, the wireless communication device 400 further comprises an antenna 130C. In the wireless communication device 400, the transceiver 112 of the wireless communication circuit 110 utilizes two antennas (such as antennas 130C and 130A or antennas 130C and 130B) at the same time to receive network packets and combines network packet signals received by the two antennas to further improve the receiving quality of network packets. In the wireless communication device 400, the antenna 130C is a default antenna for the transceiver 112. The control circuit 116 of the wireless communication circuit 110 may control the switching circuit 120 to couple one of the antennas 130A and 130B with the transceiver 112 according to the aforementioned antenna selection method so as to receive network packets together with the antenna 130C.

Figure 5:
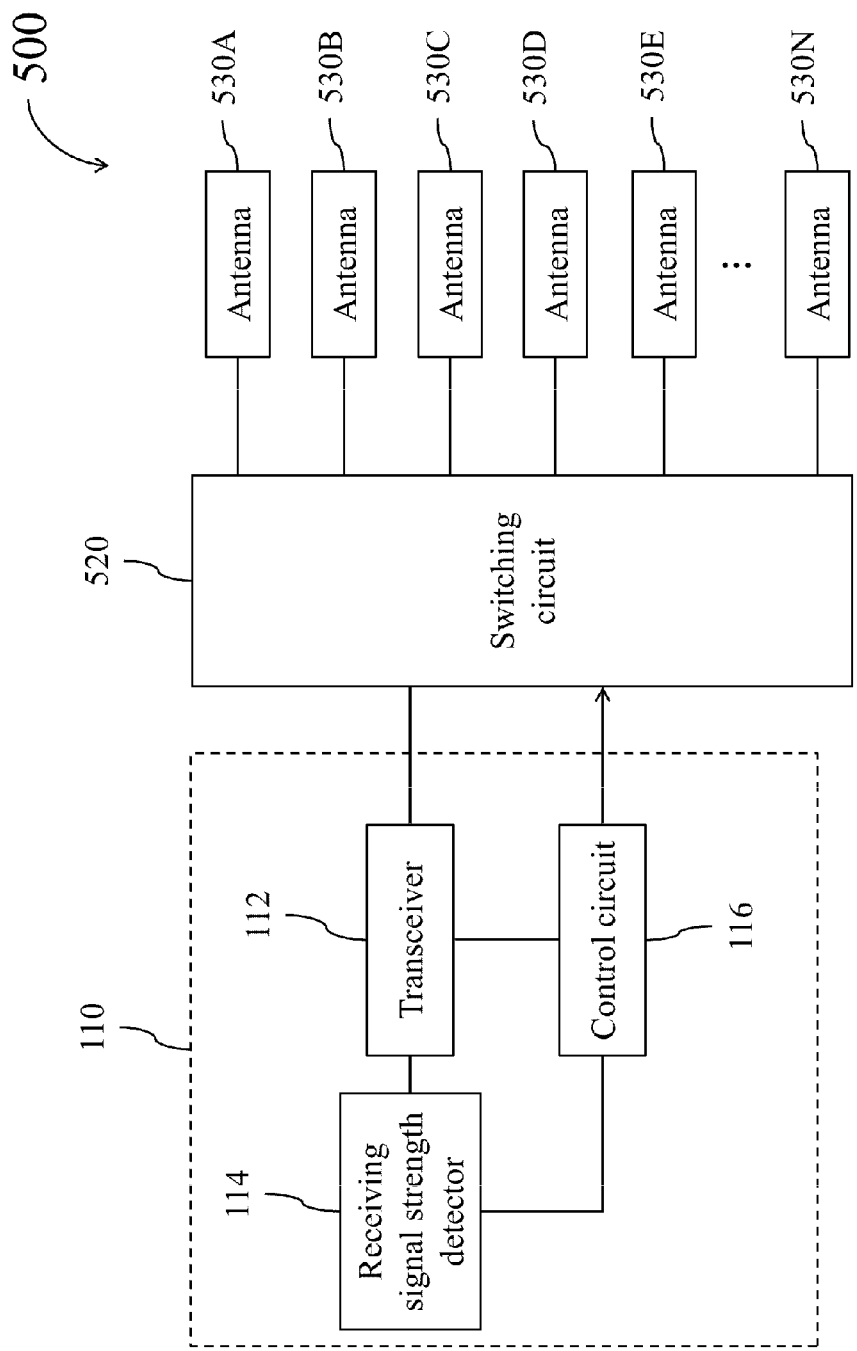
FIG. 5 shows a simplified functional block diagram of a wireless communication device according to a third embodiment of the present disclosure.

FIG. 5 is a simplified functional block diagram of a wireless communication device 500 according to a third embodiment of the present disclosure. As shown in FIG. 5, the wireless communication device 500 comprises a plurality of antennas 530A-530N respectively coupled with a switching circuit 520. For illustrative purpose, it is assumed hereinafter that the control circuit 116 of the wireless communication circuit 110 selects the antenna 530A to be a standby antenna and controls the switching circuit 520 to couple the transceiver 112 with antenna 530A for detecting network packets before receiving a network packet 300.

When the transceiver 112 detects the network packet 300 through the antenna 530A, the control circuit 116 controls the switching circuit 520 to switch the transceiver 112 between the antennas 530A-530N so that each of the antennas 530A-530N is utilized to receive a part of the preamble 310 of the network packet 300. While the transceiver 112 receives the preamble 310 of the network packet 300, the receiving signal strength detector 114 of the wireless communication circuit 110 respectively detects receiving signal strength values of the antennas 530A-530N with respect to respective receiving periods of the antennas 530A-530N.

If all of the receiving signal strength values of the antennas 530A-530N are less than the predetermined threshold STH, the control circuit 116 selects an antenna with a maximum receiving signal strength value to be the target antennas and controls the switching circuit 520 to couple the transceiver 112 with the selected target antenna, so that the transceiver 112 receives the remaining portion of the network packet 300 including the header 320 and the payload 330 of the network packet 300 through the target antenna.

While the receiving signal strength detector 114 detects receiving signal strength of the antennas, if the control circuit 116 detects that a receiving signal strength value of one of the antennas 530A-530N is greater than or equal to the predetermined value STH, the control circuit 116 may simply select the antenna as the target antenna and control the switching circuit 520 to continue to couple the transceiver 112 with the target antenna and omit subsequent antenna switching operations. In this way, the transceiver 112 receives the remaining portion of network packets through the target antenna. For example, if the control circuit 116 detects that a receiving signal strength value of the antenna 530A is greater than or equal to the predetermined value STH, the control circuit 116 may simply select the antenna 530A as the target antenna and control the switching circuit 520 to continue to couple the transceiver 112 with the target antenna and skips the subsequent antenna switching operations, so that the transceiver 112 receives the remaining portion of network packets through the antenna 530A.

Alternatively, the control circuit 116 may select a plurality of antennas having greater receiving signal strength values from the antennas 530A-530N as target antennas, so that the transceiver 112 receives the remaining portion of network packets through the selected plurality of antennas at the same time to improve the signal receiving quality.

Similar to the aforementioned embodiments, the wireless communication circuit 110 of the wireless communication device 500 may select an antenna to be utilized for receiving signals on a packet-by-packet basis and may select an antenna to be utilized for transmitting signals on a packet-by-packet basis. The advantage of dynamically selecting antenna in the aforementioned embodiments is applicable to the embodiment of FIG. 5.

Figure 6:
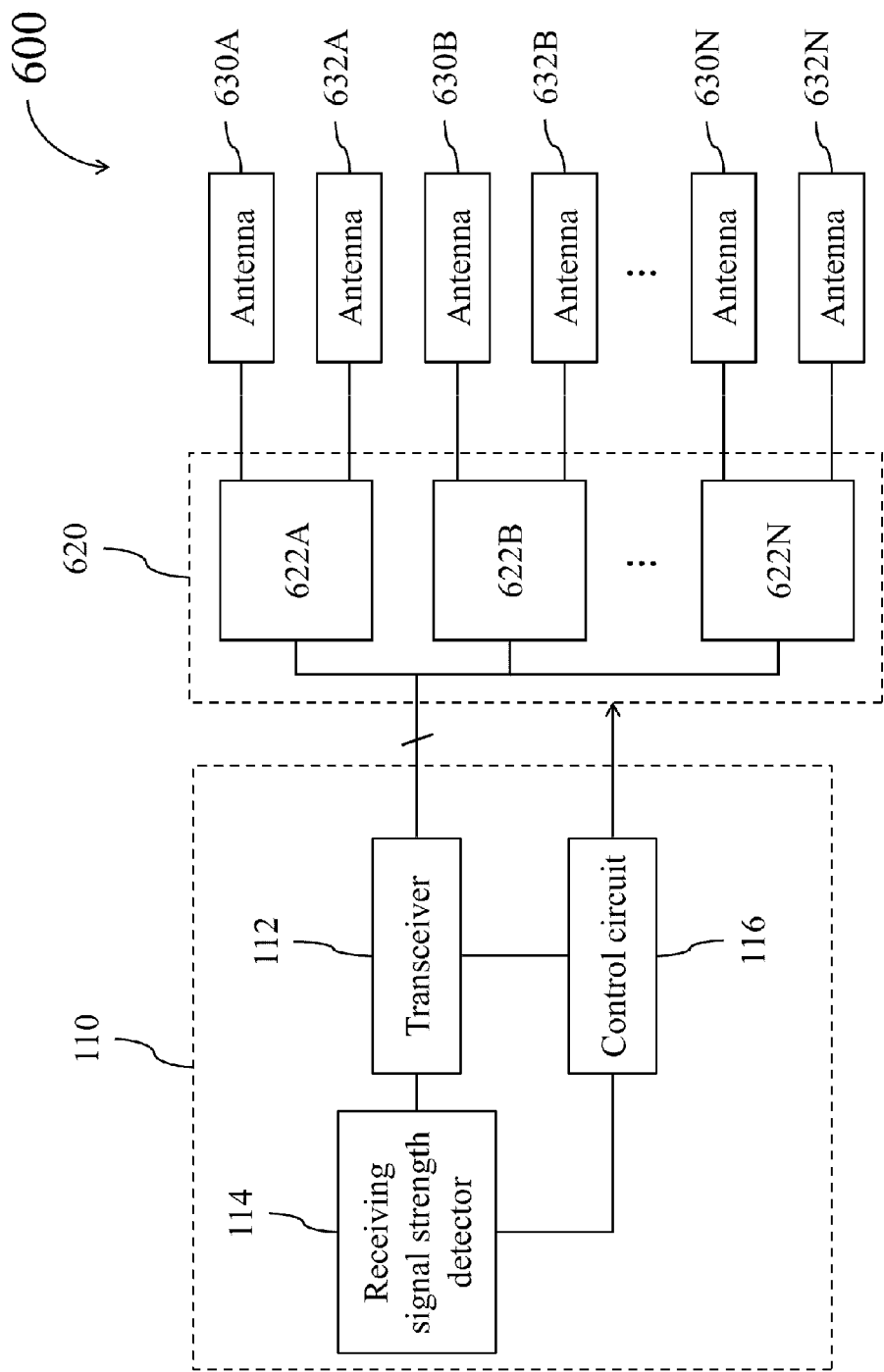
FIG. 6 shows a simplified functional block diagram of a wireless communication device according to forth embodiment of the present disclosure.

FIG. 6 is a simplified functional block diagram of a wireless communication device 600 according to a forth embodiment of the present disclosure. As shown in FIG. 6, the wireless communication device 600 comprises a first antenna group including a plurality of antennas 630A-630N and a second antenna group including a plurality of antennas 632A-

632N. A switching circuit 620 of the wireless communication device 600 comprises a plurality of switches 622A-622N, and each of the switches 622A-622N selectively couples with one antenna of the first antenna group or one antenna of the second antenna group. For example, the switch 622A may selectively couples with the antenna 630A or the antenna 632A, and the switch 622B may selectively couples with antenna 630N or antenna 632N.

For illustrative purpose, it is assumed hereinafter that the control circuit 116 of the wireless communication circuit 110 selects the antenna 630A as a standby antenna and controls the switch 622A of the switching circuit 620 to couple the transceiver 112 with the antenna 630A for detecting network packets before receiving the network packets.

While the transceiver 112 detects a network packet 300 as shown in FIG. 3 through the antenna 630A, the control circuit 116 controls the switches 622A-622N of the switching circuit 620 to couple the transceiver 112 with the antennas 630A-630N, so that the transceiver 112 receives a part of the preamble 310 of the network packet 300 through the combination of the antenna 630A-630N. In that movement, the receiving signal strength detector 114 detects the receiving signal strength of each of the antennas 630A-630N in the time period P1 and generates a plurality of corresponding receiving signal strength values. For illustrative purpose, it is assumed hereinafter that the receiving signal strength value of the antenna 630A is SA1, the receiving signal strength value of the antenna 630B is SB1 . . . and the receiving signal strength value of the antenna 630N is SN1.

Then, the control circuit 116 controls the switches 622A-622N of the switching circuit 620 to couple the transceiver 112 with the antennas 632A-632N so that the transceiver 112 receives another part of the preamble 310 of the network packet 300 through the combination of antennas 632A-632N. In that movement, the receiving signal strength detector 114 detects the receiving signal strength of each of the antennas 632A-632N and generates a plurality of corresponding receiving signal strength values. For illustrative purpose, it is assumed hereinafter that the receiving signal strength value of the antenna 632A is SA2, the receiving signal strength value of the antenna 632B is SB2 . . . and the receiving signal strength value of the antenna 632N is SN2.

The control circuit 116 selects a plurality of target antennas from the antennas 630A-630N and the antennas 632A-632N according to the detection result of the receiving signal strength detector 114, so that the transceiver 112 receives the remaining portion of the network packet 300 including the header 320 and the payload 330 of the network packet 300 through the selected multiple target antennas. The transceiver 112 combines signals received from the target antennas to further improve the signal receiving quality.

In one embodiment, the control circuit 116 compares receiving signal strength values of two antennas corresponding to each switch and selects an antenna having a greater receiving signal strength value as a target antennas. For example, if SA1 is greater than SA2, the control circuit 116 selects the antenna 630A as one of the target antennas. If SN1 is smaller than SN2, the control circuit 116 selects the antenna 632N as one of the target antennas. Therefore, the target antennas selected by the control circuit 116 may comprise antennas of the first antenna group and antennas of the second antenna group.

In another embodiment, the control circuit selects all antennas of an antenna group having a greater sum of receiving signal strength values as the target antennas. For example, if a sum of the receiving signal strength values, SA1, SB1, . . . and SN1, of the first antenna group is greater than a sum of the receiving signal strength values, SA2, SB2, . . . and SN2, of the second antenna group, the control circuit 116 selects all antennas 630A-630N of the first antenna group as the target antennas. On the contrary, if the sum of the receiving signal strength values, SA1, SB1, . . . and SN1, of the first antenna group is smaller than the sum of the receiving signal strength values, SA2, SB2, . . . and SN2, of the second antenna group, the control circuit 116 selects all antennas 632A-632N of the second antenna group as the target antennas. In other words, the control circuit 116 of this embodiment only selects the antennas in the same antenna group as the target antennas.

In another embodiment, the control circuit 116 compares receiving signal strength values of two antennas corresponding to each switch, and selects all antennas in one of the two antenna groups as the target antennas according to a majority decision. For example, after comparing the receiving signal strength values of two antennas corresponding to each switch, if P receiving signal strength values of the first antenna group are greater than the corresponding receiving signal strength values of the second antenna group, Q receiving signal strength values of the second antenna group are greater than the corresponding receiving signal strength values of the first antenna group, and P is greater than Q, the control circuit 116 selects all antennas 630A-630N of the first antenna group as the target antennas. On the contrary, if P is smaller than Q, the control circuit 116 selects all antennas 632A-632N of the second antenna group as the target antennas. In other words, the control circuit 116 of this embodiment only selects the antennas in the same antenna group as the target antennas.

The aforementioned two embodiments that select target antennas on an antenna group basis decrease the complexity of the switching circuit 620 in terms of controlling the control circuit 116. For example, the control circuit 116 may simply utilize a one-bit control signal to control the operation of the switching circuit 620.

The wireless communication circuit 110 of the wireless communication device 600 may adopt the concept of the aforementioned embodiments to select the antenna utilized for receiving signals on a packet-by-packet basis and to select the antenna utilized for transmitting signals on a packet-by-packet basis. The advantage of dynamically selecting the target antenna of the aforementioned embodiment is also applicable to the embodiment in FIG. 6.

Figure 7:
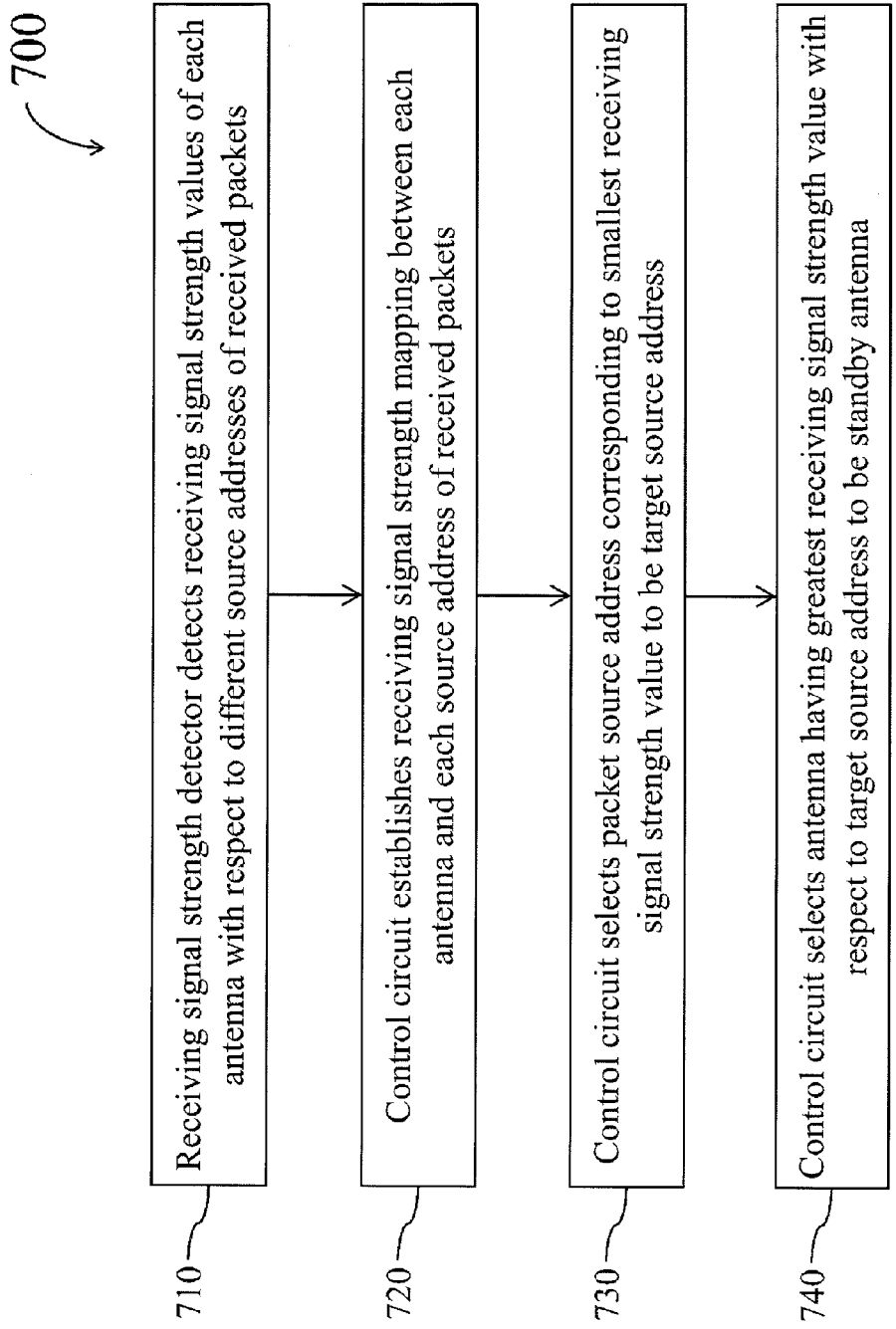
FIG. 7 shows a simplified flowchart illustrating a method for selecting a standby antenna utilized for detecting network packets according to an embodiment of the present disclosure.

As described above, during the standby period at which the wireless communication circuit 110 does not receive network packets, the control circuit 116 of the wireless circuit 110 selects one antenna as the standby antenna for detecting network packets. In implementation, the control circuit 116 may select the standby antenna according to the aforementioned detection results of the receiving signal strength detector 114. For example, FIG. 7 is a simplified flowchart 700 illustrating a method of selecting a standby antenna for detecting network packets according to one embodiment of the present disclosure.

In an operation 710, the receiving signal strength detector 114 detects the receiving signal strength values of each of the antennas with respect to different source addresses of received packets according to the method described in the above embodiments.

In an operation 720, the control circuit 116 establishes a receiving signal strength mapping between each of the antennas and each of source addresses of received packets according to detection results of the receiving signal strength detector 114. For example, FIG. 8 shows a simplified schematic diagram of a receiving signal strength mapping 800 between each of the antennas and each of source addresses of received packets. In the mapping 800, a value recorded in the intersection of a data column of a particular antenna and a data row of a particular source address of received packets represents a packet receiving signal strength value of the particular antenna with respect to the particular source address. For example, S1A represents a packet receiving signal strength value of an antenna A (such as the aforementioned antenna 130A, 530A or 630A) with respect to a source address 1, S1B represents a packet receiving signal strength value of an antenna B (such as the aforementioned antenna 130B, 530B or 630B) with respect to a source address 2, and SKC represents a receiving signal strength value of an antenna C (such as the aforementioned antenna 130C, 530C or 630C) with respect to a source address K.

In an operation 730, the control circuit 116 selects a packet source address corresponding to a smallest receiving signal strength value from the aforementioned receiving signal strength mapping (such as the mapping 800) to be a target source address. For example, if the receiving signal strength value S2B is the smallest receiving signal strength value in the mapping 800, the control circuit 116 selects the packet source address 2 corresponding to S2B to be the target source address.

Then, in an operation 740, the control circuit 116 selects an antenna having the greatest receiving signal strength value with respect to the selected target source address to be a standby antenna. For example, if the greatest receiving signal strength value recorded in the data row of the packet source address 2 is S2C, when the wireless communication circuit 110 does not transmit or receive packets, the control circuit 116 selects the antenna C as the standby antenna and controls the switching circuit to couple the transceiver 112 with the antenna C for detecting network packets.

By adopting the aforementioned method of selecting the standby antenna, the packet detection ability of each of aforementioned wireless communication devices can be improved effectively, thereby decreasing the possibility of packet loss.

Other embodiments of the invention will be apparent to those skilled in the art from consideration of the specification and practice of the invention disclosed herein. It is intended that the specification and examples be considered as exemplary only, with a true scope and spirit of the invention indicated by the following claims.

What is claimed is:

1. A wireless communication circuit for controlling a switching circuit of a wireless communication device, wherein the wireless communication device comprises a plurality of antennas, the wireless communication circuit comprising:
   a transceiver for receiving and transmitting network packets;
   a control circuit, coupled with the transceiver, for controlling the switching circuit to switch the transceiver among the plurality of antennas so that the transceiver receives a preamble of a first network packet; and
   a receiving signal strength detector, coupled with the transceiver and the control circuit, for respectively detecting receiving signal strength values of the plurality of antennas with respect to respective receiving periods of the plurality of antennas while the transceiver receives the preamble;
   wherein, if each of the receiving signal strength values of the plurality of antennas is less than a predetermined threshold, then the control circuit selects an antenna with a maximum receiving signal strength value as a target antenna and controls the switching circuit to couple the transceiver with the selected target antenna so that the transceiver receives a remaining portion of the first network packet including a header and a payload of the first network packet through the target antenna;
   wherein the control circuit establishes a receiving signal strength mapping between each of the antennas and each of packet sources of received packets according to detection results of the receiving signal strength detector, and then the control circuit selects a packet source corresponding to a minimum receiving signal strength value as a target packet source and selects an antenna having a greatest receiving signal strength value with respect to the target packet source out of the plurality of antennas as a standby antenna for detecting network packets.

2. The wireless communication circuit of claim 1, wherein when a receiving signal strength value of a first antenna of the plurality of antennas is greater than the predetermined threshold, the control circuit configures the first antenna as the target antenna directly and controls the switching circuit to stop switching the transceiver among the plurality of antennas.

3. The wireless communication circuit of claim 1, wherein the control circuit selects an antenna to be utilized for receiving signals on a packet-by-packet basis.

4. The wireless communication circuit of claim 3, wherein the control circuit selects an antenna to be utilized for transmitting signals on a packet-by-packet basis.

5. The wireless communication circuit of claim 4, wherein the control circuit controls the switching circuit to couple the transceiver with an antenna that is a most recently selected receiving antenna so that the transceiver transmits network packets through the antenna.

6. The wireless communication circuit of claim 4, wherein the control circuit selects an antenna that is selected to be a receiving antenna more frequent than other antennas in a plurality of recent packet receiving operations to be a transmitting antenna and controls the switching circuit to couple the transceiver with the transmitting antenna so that the transceiver transmits network packets through the transmitting antenna.

7. The wireless communication circuit of claim 4, wherein before transmitting a second network packet to a wireless communication device of a target source address, the control circuit selects an antenna for receiving network packets from the target source address most recently and controls the switching circuit to couple the transceiver with the transmitting antenna so that the transceiver transmits the second network packet through the transmitting antenna.

8. The wireless communication circuit of claim 4, wherein before transmitting a second network packet to a wireless device of a target source address, the control circuit selects an antenna for receiving network packets from the target source address more frequent than other antennas in a plurality of recent packet receiving operations to be a transmitting antenna and controls the switching circuit to couple the transceiver with the transmitting antenna so that the transceiver transmits the second network packet through the transmitting antenna.

9. The wireless communication circuit of claim 3, wherein the transceiver is further coupled with a default antenna, and the transceiver utilizes both the default antenna and the target antenna selected by the control circuit to receive network packets and combines packet signals received by the default antenna and the target antenna.

10. The wireless communication circuit of claim 3, wherein the control circuit selects a plurality of target antennas from the plurality of antennas according to detection results of the receiving signal strength detector and controls the switching circuit to couple the transceiver with the plurality of selected target antennas at the same time so that the transceiver receives the remaining portion of the first network packet including a header and a payload of the first network packet through the plurality of selected target antennas and combines signals received by the plurality of target antennas.

11. The wireless communication circuit of claim 10, wherein the plurality of antennas are divided into a first antenna group and a second antenna group, and the switching circuit comprises a plurality of switches, each of the plurality of switches selectively couples with one antenna of the first antenna group or one antenna of the second antenna group.

12. The wireless communication circuit of claim 11, wherein the control circuit controls the plurality of switches to respectively couple antennas in the first antenna group with the transceiver so that the transceiver receives a part of the preamble of the first network packet through the antennas in the first antenna group, and then the control circuit controls the plurality of switches to respectively couple antennas in the second antenna group with the transceiver so that the transceiver receives another part of the preamble of the first network packet through the antennas in the second antenna group.

13. The wireless communication circuit of claim 12, wherein the control circuit compares receiving signal strength values of two antennas corresponding to each switch and then selects an antenna having a greater receiving signal strength value as a target antenna.

14. The wireless communication circuit of claim 12, wherein if a sum of receiving signal strength values of the first antenna group is greater than a sum of receiving signal strength values of the second antenna group, the control circuit selects all antennas of the first antenna group as target antennas.

15. The wireless communication circuit of claim 12, wherein if P receiving signal strength values in the first antenna group are greater than corresponding receiving signal strength values in the second antenna group, Q receiving signal strength values in the second antenna group are greater than corresponding receiving signal strength values in the first antenna group, and P is greater than Q, the control circuit selects all antennas of the first antenna group as target antennas.

16. The communication circuit of claim 1, wherein each of the packet sources is a source address of one of the received packets.

* * * * *